United States Patent [19]

Lindner et al.

[11] Patent Number: 5,187,231

[45] Date of Patent: Feb. 16, 1993

[54] HIGH HEAT-DISTORTION PLASTICS

[75] Inventors: Christian Lindner, Cologne; Herbert Eichenauer, Dormagen; Holger Lütjens; Hans-Eberhard Braese, both of Cologne, all of Fed. Rep. of Germany

[73] Assignee: Bayer Aktiengesellschaft, Leverkusen, Fed. Rep. of Germany

[21] Appl. No.: 753,653

[22] Filed: Aug. 30, 1991

[30] Foreign Application Priority Data

Sep. 11, 1990 [DE] Fed. Rep. of Germany ....... 4028749

[51] Int. Cl.$^5$ ...................... C08L 33/10; C08L 27/06; C08L 25/12; C08L 35/06
[52] U.S. Cl. ...................................... 525/207; 525/74; 525/197; 525/198
[58] Field of Search .................. 525/207, 74, 197, 198

[56] References Cited

U.S. PATENT DOCUMENTS

| | | | |
|---|---|---|---|
| 3,626,033 | 12/1971 | Keskkula et al. | 525/74 |
| 3,642,949 | 2/1972 | Stafford et al. | 525/74 |
| 4,311,806 | 1/1982 | Dufour | 525/74 |
| 4,469,844 | 9/1984 | Doak | 525/74 |
| 4,798,868 | 1/1989 | Lardi et al. | 525/207 |
| 5,004,783 | 4/1991 | Percec | 525/74 |

FOREIGN PATENT DOCUMENTS

| | | | |
|---|---|---|---|
| 757163 | 4/1971 | Belgium | 525/207 |
| 201966 | 5/1985 | European Pat. Off. | 525/207 |
| 59-197448 | 11/1984 | Japan | 525/207 |

*Primary Examiner*—Carman J. Seccuro, Jr.
*Attorney, Agent, or Firm*—Connolly and Hutz

[57] ABSTRACT

Plastics suitable for use as thermoplastic moulding compositions obtained from
A) a thermoplastic vinyl polymer and
B) a mixture of
  B1) a copolymer of 35 to 49% by weight of maleic acid anhydride and 65 to 51% by weight of styrene and
  B2) a copolymer of styrene, α-methylstyrene or mixtures thereof on the one hand and acrylonitrile on the other having an acrylonitrile content of 35 to 60% by weight [based on B2)]
and a process for their preparation.

11 Claims, No Drawings

HIGH HEAT-DISTORTION PLASTICS

This invention relates to thermoplastic moulding compositions with improved heat-distortion stability based on thermoplastic vinyl polymers and mixtures of special styrene polymers.

Thermoplastic polymers such as polystyrene, styrene copolymers and vinyl chloride are employed on a large scale for the production of moulded articles. These moulded articles can only be used within a temperature range in which the polymers do not soften. The range of application of the polymers may be increased, i.e. in the direction of higher temperatures, by the incorporation, by copolymerisation, of comonomers (e.g. maleic acid anhydride or imide) which increase the glass temperature of the polymers or by adding polymers of a different structure which have a higher glass temperature.

The first method is only rarely usable since the copolymerisation results in a quite different polymer with different properties which may be unsuitable as a substitution for an established product. The second method also can only be used rarely since the polymers are in most cases incompatible.

There is therefore a demand for polymers with a high dimensional stability in the heat which are sufficiently compatible with other polymers to ensure good basic mechanical properties of the mixtures. These polymers must be capable of being modified so that their compatibility and dimensional stability under heat can be adapted to the individual purpose. Moreover, the mixtures must be capable of taking up fillers, additives and modifiers.

It was found that mixtures of styrene copolymers having a high acrylonitrile content with styrene copolymers having a high maleic acid anhydride content have these properties. The properties of these mixture can easily be modified by altering the ratio in which the two styrene copolymers are mixed. These mixtures are compatible with a wide variety of technical polymers.

This invention thus relates to plastics suitable for use as thermoplastic moulding compositions and obtained from A) a thermoplastic vinyl polymer and
B) a mixture of
  B1) a copolymer of 35 to 49% by weight of maleic acid anhydride and 65 to 51% by weight of styrene and
  B2) a copolymer of styrene, α-methylstyrene or mixtures thereof on the one hand and acrylonitrile on the other having an acrylonitrile content of from 35 to 60% by weight [based on B2].

The invention further relates to a process for the preparation of such plastics, wherein in a first stage, the copolymers B1) and B2) are mixed together in the presence of a solvent for B1) and B2), in a second stage the mixture of B1) and B2) is separated from the solution and in a third stage the mixture of B1) and B2) is mixed with the thermoplastic vinyl polymer A), Examples of thermoplastic vinyl polymers A) in this context include thermoplastic homo- and interpolymers of styrene, α-methylstyrene, maleic acid anhydride, maleiimide, acrylonitrile and alkyl methacrylate—in the case of styrene/acrylonitrile copolymers the acrylonitrile content is limited to a maximum of 30% by weight —in particularly styrene/acrylonitrile copolymers having acrylonitrile contents of from 10 to 30% by weight, α-methylstyrene/acrylonitrile copolymers having acrylonitrile contents of from 25 to 35% by weight, polymethyl methacrylate, copolymers of styrene and/or α-methylstyrene and methyl methacrylate, copolymers of styrene with up to 20% by weight of maleic acid derivatives, polyvinyl chloride and polyvinylidene chloride.

The following are particularly preferred thermoplastic vinyl polymers A): Polyvinyl chloride (PVC), styrene/acrylonitrile copolymers (SAN), styrene/maleic acid anhydride copolymers (SMA), acrylonitrile/methyl methacrylate copolymers (AMS) and polymethylmethacrylate (PMMA).

The above-mentioned polymers in a form modified with rubbers are also suitable as components A), e.g. graft polymers of styrene copolymers on rubbers (butadiene-acrylate-, olefin rubbers) (=ABS, ASA, EPAS), rubber modified polymethylmethacrylate polymers and rubber modified polyvinyl chloride, e.g. graft polymers of vinyl chloride on rubbers.

These thermoplastic vinyl polymers are known. Copolymers B1) within the meaning of this invention contain large quantities of maleic acid anhydride incorporated by polymerisation and are not themselves capable of being processed thermoplastically. They preferably consist of 35 to 49% by weight, in particular 45 to 49% by weight, preferably 50 mol-% of maleic acid anhydride units and 65 to 51% by weight, in particular 55 to 51% by weight, preferably 50 mol-% of styrene units. They thus preferably have an alternating structure and may be regarded as "styromals".

Copolymers B2) within the meaning of this invention are copolymers of styrene, α-methylstyrene or mixtures thereof on the one hand and acrylonitrile on the other having an acrylonitrile content of from 35 to 60% by weight, in particular from 45 to 55% by weight [based on B2].

B1) and B2) always differ from A) in their chemical structure.

Preferred chemical materials according to the invention consist of 90 to 20% by weight, in particular 80 to 40% by weight of A) and 10 to 80%, in particular 20 to 60% by weight of B) [based on the chemical material].

The copolymers B2) are prepared by conventional radical copolymerisation of the monomers, in particular by aqueous emulsion polymerisation, suspension polymerisation, solution polymerisation or solvent-free polymerisation. Semi-continuous or fully continuous processes are preferred for obtaining sufficient chemical uniformity of B2).

The copolymers B1) are prepared by radical polymerisation in liquids, e.g. ketones, aromatic compounds or amides. When the monomers are used in a molar ratio of 1:1, a discontinuous or batchwise polymerisation is normally sufficient. The polymers in that case are obtained as solutions or suspensions from which they can be isolated by conventional precipitation or filtration.

The chemical materials according to the invention are prepared by mixing (compounding) a previously prepared mixture of the polymers B1) and B2) with the thermoplastic vinyl polymer A).

The mixtures of B1) and B2) may easily be prepared. B1) and B2) may be dissolved in a suitable common solvent and the mixtures may then be precipitated or evaporated or a solution of B1) may be mixed with molten B2) and then evaporated. Any solvents capable of dissolving the polymers B1) and B2) at temperatures from 20° to about 150° C. are suitable in principle, in particular aromatic solvents such as toluene, ethyl benzene or chlorobenzene; also ketones such as acetone and methyl ethyl ketone. Ethyl benzene is a preferred solvent and the mixture is preferably isolated by means of high viscosity apparatus with means for evaporation, such as kneaders or screws.

Preferred polymer mixtures B) contain up to 70% by weight, in particular up to 50% by weight of B1).

A perfect plastics material is not obtained if the procedure according to the invention is not observed, e.g. if B1) and B2) are not first mixed or if they are mixed directly without the aid of solvents. B1) begins to decompose (brown discolouration) at the operating temperatures then required and the moulded articles obtained are not homogeneous and free from streaks and spots because B1), for example, cannot be converted into a thermoplastically processible melt. Further, the dimensional stability under heat of the resulting chemical materials is not sufficiently improved.

The plastics materials according to the invention are opaque synthetic resins which may be coloured, pigmented, stabilized, finished and mixed with fillers by the usual methods of plastics processing. They may be used for the production of plastics products with increased dimensional stability under heat, e.g. for hot water pipes, films, electrical apparatus and parts of motor vehicles.

EXAMPLES

Example 1

Styrene/Maleic Acid Anhydride Copolymers (B1)

A copolymer of 50 mol-% of maleic acid anhydride and 50 mol-% of styrene is prepared by introducing 98 parts by weight of maleic acid anhydride in 400 parts by weight of toluene into a reactor at a temperature of 60° to 70° C. After initiation with 0.7 parts by weight of azoisobutyric acid nitrile, 104 parts by weight of styrene are added within 3 hours at 60° to 70° C. The polymer obtained from the polymerisation precipitates in the reactor and may be filtered off after completed polymerisation and washed. The polymer contains 48.5% by weight of maleic acid anhydride units and has a Staudinger Index in acetone of $[\mu]=0.22$ dl/g.

Example 2

Styrene/Acrylonitrile Copolymers (B2)

1000 Parts by weight of water, 4 parts by weight of 1N-sodium hydroxide solution and 5 parts by weight of disproportionated abietic acid are introduced into a reactor. 70 Parts by weight of the monomer mixtures described under 2.1. to 2.5. are added at a temperature of 70° C. After initiation with 3 parts by weight of potassium persulphate in 50 parts by weight of water, the following are introduced into the reactor within 4 hours:

| Monomer mixture: | of styrene and acrylonitrile (including the 70 parts by weight initially introduced | 900 parts by weight |
|---|---|---|
| Emulsifier solution: | Dodecylmercaptan | 2 parts by weight |
| | disproportionated abietic acid | 20 parts by weight |
| | 1N sodium hydroxide solution | 15 parts by weight |
| | Water | 600 parts by weight. |

Polymerisation is then continued for 4 hours. The polymers obtained are isolated from the emulsions by coagulation, washed and dried.

Monomers mixtures used:

| Experiment | Styrene Parts by weight | Acrylonitrile Parts by weight | Acrylonitrile content in the polymer % By weight |
|---|---|---|---|
| 2.1 | 468 | 432 | 47 |
| 2.2 | 513 | 387 | 42 |
| 2.3 | 558 | 342 | 38 |
| 2.4 | 603 | 297 | 32 |
| 2.5 | 648 | 252 | 27 |

The polymers have Staudinger Indices of $[\mu]$ 0.60 dg/l.

Example 3

Preparation of the Polymer Mixtures

The styrene/maleic acid anhydride copolymer B1) is dissolved in acetone to form 40% by weight solutions.

The styrene/acrylonitrile copolymers B2) are also dissolved in acetone to form 25% by weight solutions.

These solutions are mixed together to form solutions containing 30% by weight of B1) and 70% by weight of B2). The solvent is then removed by evaporation.

TABLE 1

| | Prepared polymer mixtures [B1) and B2)] | | | | | |
|---|---|---|---|---|---|---|
| | | B2) 70% by wt. from experiment | | | | |
| Experiment | B1) 30% by wt. | 2.1 | 2.2 | 2.3 | 2.4 | 2.5 |
| 3.1 | X | X | | | | |
| 3.2 | X | | X | | | |
| 3.3 | X | | | X | | |
| 3.4 | X | | | | X | |
| 3.5 | X | | | | | X |

Example 4

Thermoplastic Vinyl Polymer (A)

Polyvinyl chloride ("Vestolit 56858") having a K-value of 68.

Example 5

Chemical Materials

Products 3.1 to 3.5 and 4 are compounded on rollers at 190° C. within 10 minutes and then worked up into moulded articles at 195° C. 1 Part by weight of Irgastab T 22 n; 0.2 parts by weight of Loxiol G 70, based on 100 parts by weight of the chemical material, are used as additives. The results are summarized in Table 2.

TABLE 2

| | Properties of the chemical materials | | | | | | | | | | |
|---|---|---|---|---|---|---|---|---|---|---|---|
| | Thermoplastic vinyl polymers | Polymer mixture | | | | | Polymers | | Dimensional stability under heat | |
| | 4 | 3.1 | 3.2 | 3.3 | 3.4 | 3.5 | 2.1 (B2) | 1 (B1) | Vicat °C. | |
| Experiment | Parts by wt. | Parts by wt. | | | | | Parts by wt. | | DIN 53400 | Remarks |
| 5.1 | 100 | — | — | — | — | — | — | — | 79 | Comparison |

TABLE 2-continued

| | Thermoplastic vinyl polymers 4 | Properties of the chemical materials | | | | | | Dimensional stability under heat | |
|---|---|---|---|---|---|---|---|---|---|
| | | Polymer mixture | | | | Polymers | | | |
| Experiment | Parts by wt. | 3.1 | 3.2 | 3.3 | 3.4 | 3.5 | 2.1 (B2) | 1 (B1) | Vicat °C. DIN 53400 | Remarks |
| | | Parts by wt. | | | | | Parts by wt. | | | |
| 5.2 | 50 | 50 | — | — | — | — | — | — | 102 | |
| 5.3 | 50 | — | 50 | — | — | — | — | — | 102 | |
| 5.4 | 50 | — | — | 50 | — | — | — | — | 101 | |
| 5.5 | 50 | — | — | — | 50 | — | — | — | 94 | Comparison |
| 5.6 | 50 | — | — | — | — | 50 | — | — | 91 | Comparison |
| 5.7 | 50 | — | — | — | — | — | 50 | — | 91 | Comparison |
| 5.8 | 50 | — | — | — | — | — | — | 50 | not processible | Comparison |

When materials 5.2, 5.3 and 5.4 are prepared by directly mixing all the components, i.e. without first mixing B2) with B1), discoloured, inhomogeneous, friable moulded articles marked with streaks and spots are obtained.

Materials 5.2 to 5.4 according to the invention are opaque. Their thermostability is outstanding. No change in colour on exposure to elevated temperatures is observed.

We claim:

1. Plastics materials suitable for use as thermoplastic moulding compositions and obtained from
    A) a thermoplastic vinyl polymer selected from the group consisting of polyvinylchloride, styrene/acrylonitrile copolymers, styrene/maleic acid anhydride copolymers, acrylonitrile/methylmethacrylate copolymers, polymethylmethacrylate, graft polymers of styrene copolymers grafted onto rubber, polyvinyl chloride grafted onto rubber and polymethylmethacrylate grafted onto rubber and
    B) a mixture of
        B1) a copolymer of 35 to 49% by weight of maleic acid anhydride and 65 to 51% by weight of styrene and
        B2) a copolymer of styrene, α-methylstyrene or mixtures thereof and acrylonitrile with an acrylonitrile content of from 35 to 60% by weight (based on B2) which has been prepared by dissolving B1) and B2) in a solvent and removing the solvent or by dissolving B1) in a solvent, mixing with a melt of B2 and removing the solvent, said B1) and B2) differ from A) in their chemical structure.

2. A process for the preparation of chemical materials according to claim 1, wherein in a first stage the copolymers B1) and B2) are mixed together in the presence of a solvent for B1) and B2), in a second stage the mixture of B1) and B2) is separated from the solution and in a third stage the mixture of B1) and B2) is mixed with the thermoplastic vinyl polymer A).

3. The plastic materials as claimed in claim 1, wherein said thermoplastic vinyl polymer is selected from the group consisting of polyvinylchloride, styrene/acrylonitrile copolymers, styrene/maleic acid anhydride copolymers, acrylonitrile/methylmethacrylate copolymers and polymethylmethacrylate.

4. The plastic materials as claimed in claim 1, wherein the thermoplastic vinyl polymer is PVC.

5. The plastic materials as claimed in claim 1, wherein B1) copolymer contains of 45–49% by weight of maleic acid anhydride.

6. The plastic materials as claimed in claim 1, wherein B1) copolymer contains of 55–51% by weight of styrene.

7. The plastic materials as claimed in claim 1, wherein in B2) the acrylonitrile content is from 45–55% by weight.

8. The plastic materials as claimed in claim 1, wherein the thermoplastic vinyl polymer is in an amount of 90–20% by weight.

9. The plastic materials as claimed in claim 1, wherein the thermoplastic vinyl polymer is in an amount of 80–40% by weight.

10. The plastic materials as claimed in claim 1, wherein the mixture of B is in an amount of 10–80% by weight.

11. The plastic materials as claimed in claim 1, wherein the mixture of B is in an amount of 20–60% by weight.

* * * * *